US010279328B2

(12) United States Patent
Hoekstra et al.

(10) Patent No.: US 10,279,328 B2
(45) Date of Patent: May 7, 2019

(54) PROCESS FOR THE PREPARATION OF METAL-CARBON CONTAINING BODIES

(71) Applicant: BASF Corporation, Florham Park, NJ (US)

(72) Inventors: Jacobus Hoekstra, Utrecht (NL); John Wilhelm Geus, Bilthoven (NL); Leonardus Wijnand Jenneskens, Soest (NL); Dirk van de Kleut, Amersfoort (NL); Edward Jan Vlietstra, IJsselstein (NL)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/547,428

(22) Filed: Nov. 19, 2014

(65) Prior Publication Data

US 2015/0069285 A1   Mar. 12, 2015

Related U.S. Application Data

(63) Continuation of application No. 13/203,577, filed as application No. PCT/NL2010/005009 on Mar. 1, 2010, now abandoned.

(30) Foreign Application Priority Data

Feb. 27, 2009   (EP) .................................... 09153963

(51) Int. Cl.
  *B01J 6/00*   (2006.01)
  *B01J 37/08*   (2006.01)
  (Continued)

(52) U.S. Cl.
  CPC ............... *B01J 6/008* (2013.01); *B01J 23/72* (2013.01); *B01J 23/745* (2013.01); *B01J 23/75* (2013.01);
  (Continued)

(58) Field of Classification Search
  None
  See application file for complete search history.

(56) References Cited

U.S. PATENT DOCUMENTS 5,147,527 A * 9/1992 Hettinger ............. C10G 11/182
                                                    208/113
5,488,023 A * 1/1996 Gadkaree ................. B01J 21/18
                                                    502/182

(Continued)

FOREIGN PATENT DOCUMENTS

AR       075772 A1    4/2011
CA     2753789 A2    9/2010

(Continued)

OTHER PUBLICATIONS

"Synthesis of Carbon-Encapsulated Metal Nanoparticles from Wood Char" Yicheng Du et al. Forest Products Journal vol. 60, No. 6. Sep. 2010).*

(Continued)

*Primary Examiner* — Melvin C. Mayes
*Assistant Examiner* — Colette B Nguyen
(74) *Attorney, Agent, or Firm* — Lowenstein Sandler LLP

(57) ABSTRACT

The invention is directed to the production of metal-carbon containing bodies, which process comprises impregnating cellulose, cellulose-like or carbohydrate bodies with an aqueous solution of at least one metal compound, followed by heating the impregnated bodies in an inert and substantially oxygen-free atmosphere, thereby reducing at least part of the at least one metal compound to the corresponding metal or metal alloy.

12 Claims, 5 Drawing Sheets

(51) Int. Cl.
- *B01J 23/72* (2006.01)
- *B01J 23/745* (2006.01)
- *B01J 23/75* (2006.01)
- *B01J 23/755* (2006.01)
- *B01J 35/00* (2006.01)
- *B01J 21/18* (2006.01)

(52) U.S. Cl.
CPC .......... *B01J 23/755* (2013.01); *B01J 35/002* (2013.01); *B01J 35/006* (2013.01); *B01J 37/08* (2013.01); *B01J 37/082* (2013.01); *B01J 21/18* (2013.01)

(56) References Cited

U.S. PATENT DOCUMENTS

| | | | |
|---|---|---|---|
| 5,593,740 A | 1/1997 | Strumban et al. | |
| 5,641,872 A | 6/1997 | Darsow | |
| 5,780,101 A * | 7/1998 | Nolan | B82Y 30/00 423/445 B |
| 6,051,156 A * | 4/2000 | Yoshida | H01F 1/0027 252/62.54 |
| 8,283,466 B2 | 10/2012 | Frost | |
| 8,828,485 B2 | 9/2014 | Lian et al. | |
| 2003/0119665 A1 | 6/2003 | White | |
| 2003/0119920 A1 | 6/2003 | Wang | |
| 2003/0175580 A1 | 9/2003 | Ozaki et al. | |
| 2005/0116195 A1* | 6/2005 | Tsang | B01J 21/18 252/62.51 R |
| 2006/0041036 A1* | 2/2006 | Mohanty | C08L 7/00 524/9 |
| 2006/0116443 A1* | 6/2006 | Probst | B82Y 30/00 523/215 |
| 2007/0138444 A1 | 6/2007 | De Ruiter | |
| 2009/0098033 A1* | 4/2009 | Lian | B01J 13/02 423/213.5 |
| 2012/0046162 A1 | 2/2012 | Hoekstra et al. | |
| 2012/0065279 A1 | 3/2012 | Su | |

FOREIGN PATENT DOCUMENTS

| | | |
|---|---|---|
| CN | 102413922 A1 | 4/2012 |
| DE | 42 34 785 | 4/1993 |
| DE | 44 16 576 | 11/1995 |
| DE | 44 16 576 C1 | 11/1995 |
| DE | 100 03 660 | 5/2001 |
| DE | 10 2006 022 866 | 11/2007 |
| EP | 0696473 | 2/1996 |
| EP | 1589131 | 10/2005 |
| EP | 2233207 A1 | 9/2010 |
| GB | 2 014 973 A | 2/1979 |
| JP | 63 123803 A | 5/1988 |
| JP | 01 272643 A | 10/1989 |
| JP | H0283209 | 3/1990 |
| JP | H02307818 | 12/1990 |
| JP | H10297912 | 11/1998 |
| JP | 2001122608 | 5/2001 |
| JP | 03 106442 | 4/2003 |
| JP | 2004 075468 | 3/2004 |
| JP | 2004 138097 A | 5/2004 |
| JP | 2005126292 | 5/2005 |
| JP | 2007 169152 A | 12/2005 |
| JP | 2007290949 | 11/2007 |
| JP | 2008 262800 | 10/2008 |
| JP | 2008 288084 | 11/2008 |
| JP | 2011 551998 | 3/2010 |
| JP | 2012519233 A | 8/2012 |
| JP | 55 59822 A | 7/2014 |
| JP | 2016005843 A | 1/2016 |
| KR | 20120027001 A | 3/2012 |
| MX | 2011009036 A | 9/2011 |
| RU | 2170140 | 7/2001 |
| RU | 2345833 | 2/2009 |
| RU | 20111393334 A | 4/2013 |
| SU | 2908 | 9/1924 |
| SU | 715458 | 2/1980 |
| TW | 201036700 A | 10/2010 |
| TW | 494165 B | 8/2015 |
| WO | 93/24214 A1 | 12/1993 |
| WO | 99/46782 A2 | 9/1999 |
| WO | WO99/46782 * | 9/1999 |
| WO | WO 03/057626 * | 7/2003 |
| WO | 2007/131795 | 11/2007 |
| WO | 2010098668 A2 | 9/2010 |

OTHER PUBLICATIONS

"A Simple Technique for the Synthesis of Filled Carbon Nanoparticles". P.J.F. Harris et al. Aug. 21, 1998.*

"Functional Carbonaceous Materials From Hydrothermal Carbonization of Biomass: An Effective Chemical Process" Bo Hu et al. Jun. 2008.*

International Search Report & Written Opinion on application No. PCT/IN2010/050099, dated Aug. 18, 2010.

Hu, Bo, et al. "Functional carbonaceous materials from hydrothermal carbonization of biomass: an effective chemical process." Dalton Transactions 40 (2008): 5414-5423.

Xianjin Cui, et al. Small Journal 2006,2, No. 6, pp. 756-759.

"A Facile Route to Carbon-Coated Nickel-Based Metal Nanoparticles". Guo-Xing Zhu et al. (The Royal Society of Chemistry 2007. 17, 2301-2306.

* cited by examiner 500 nm

PROCESS FOR THE PREPARATION OF METAL-CARBON CONTAINING BODIES

CROSS REFERENCE TO RELATED APPLICATIONS

This application is a continuation of U.S. Ser. No. 13/203,577, now abandoned, and claims priority from PCT/NL2010/050099 having a priority date of Feb. 27, 2009 based on EP 09153963.5, all of which are incorporated herein by reference in their entirety.

FIELD OF THE INVENTION

The invention is directed to a process for the production of metal-carbon containing bodies, more in particular ferromagnetic bodies comprising a core of a ferromagnetic metal such as iron, nickel and cobalt or metal alloy thereof, wherein the surface of the core is covered with a layer of graphitic carbon or aggregates of such ferromagnetic particles, or for the production of graphitic bodies having catalytically active metal particles on the surface thereof, including particles of metals that are difficult to reduce.

BACKGROUND OF THE INVENTION

Generally, catalytically active materials are applied to highly porous materials in more or less fine distributions. On the one hand this is done because many catalytically active materials sinter quickly at the temperatures at which the catalyst must be pre-treated or used. On the other hand one must use carrier materials in the case of very expensive catalytically active materials, such as precious metals, for example platinum, palladium, or ruthenium. In those cases the aim is to obtain a maximum number of atoms of the catalytically active component on the surface of the catalytically active particles. Therefore, these catalytically active materials are often used as particles with sizes of about 1 nm. When expensive catalytically active materials, such as precious metals, are used, carbon based carriers are very attractive. Once the catalyst is deactivated, the precious metal can easily be reclaimed by oxidizing the carbon carrier. After oxidation the precious metal remains, and can be used again.

The mechanical strength of the catalyst carriers is of great importance in their application. This applies first of all to the use of catalysts suspended in a liquid phase. To keep the catalytically active particles well dispersed in the liquid, the liquid must be agitated vigorously. Furthermore, the catalyst must be separated from the liquid, for example by filtration or centrifugation, at the completion of the reaction. During this, carrier particles with a low mechanical strength will disintegrate, yielding extremely small particles. At the current state-of-the-art such particles cannot easily be separated by filtration or centrifugation. In particular when precious metals are used as the catalytically active materials this is unacceptable, because it will result in unacceptable losses of the expensive precious metal. The mechanical strength is also of great importance when the catalyst is used as a fixed bed catalyst. During the introduction of the catalyst bodies in the reactor virtually no attrition or dust generation is allowed. Dust generation results in a large pressure drop over the catalyst bed, while small attrition-generated particles are entrained by the reactant flow that is passed through the reactor. The formation of small particles by attrition also yields a catalyst that shows a non-stable performance in time. Very often the selectivity decreases. Both effects are unwanted, since a stable performance is necessary from a controlling and safety aspect.

According to the general state-of-the-art, activated carbon is used as the carbon carrier. Activated carbon is manufactured from natural materials, such as wood or peat. This is objectionable, because generally the characteristics of the activated carbon obtained from such materials are hard to control. Providing bodies comprising active carbon with constant, well-adjustable characteristics is therefore a known problem that hasn't been satisfactorily solved until now. An additional objection is the fact that, in the presence of (small amounts of) surfactants, such as detergents, in the liquid the catalyst particles must be dispersed in, catalyst bodies produced from activated carbon might disintegrate quickly.

In the case of bodies intended for a fixed catalyst bed, in which no attrition is allowed, the most obvious possibility is the use of carbon obtained by a thermal treatment of coconut shells. This provides very tough and mechanically strong bodies. However, the fact that the accessible surface of carbon obtained by thermal decomposition of coconut shells is small, is a drawback. As a result the obtainable catalytically active surface per unit volume is relatively small.

The final drawback of carrier materials produced from natural starting materials is their chemical composition. Natural materials often contain elements such as potassium, magnesium, calcium, and sulphur, which could cause problems during the use as catalyst or the recycling of the precious metals. There is, therefore, a strong technological need for carbon based carriers with a high mechanical strength and an extremely well controlled chemical composition that can consequently be produced from a source wherein the properties of which can be better controlled than from peat and wood starting materials.

It has been proposed to manufacture such catalyst carriers from carbon nanofibers or nanotubes. In WO 93/24214 (Hyperion) it is proposed to use carbon nanofibers or nanotubes as catalyst carriers in which the graphitic layers are oriented essentially in parallel to the filament axis. The use of such relatively long and straight carbon filaments as bodies with controllable dimensions is difficult.

The bodies of catalysts to be employed in a fixed catalyst bed must have a minimum size of about 1 mm. The pressure drop with smaller particles is too high with technical applications. It has proven to be very difficult to manufacture mechanically strong bodies from these sizes from the carbon nanofibers or nanotubes described above.

Indeed, for catalysts the dimensions and porosity are of great importance. In fixed catalyst beds the dimensions of the carrier bodies determine the pressure drop and the transport of reactants and reaction products through the catalyst bodies. In the case of liquid-suspended catalysts the transport of the reactants and reaction products is of great importance. The dimensions of the catalyst bodies are, as indicated above, of great importance to these transports, as well as to the separation of the bodies, for example by filtration of centrifugation. Another drawback is the fact that carbon nanofibers or nanotubes must be grown from metallic particles applied on carriers such as silicon dioxide or aluminum oxide. These carriers can often interfere with the application of the obtained carbon carriers in liquid phase reactions.

It has been proposed to manufacture carbon-based carrier bodies by thermal decomposition of spheres of microcrystalline cellulose WO 2007/131795 (Glatt). Such spheres are known in the state-of-the-art for the controlled release of medicinal compounds ("slow release"). It was found that carbon spheres with a very high mechanical strength could be produced this way. Considering the fact that microcrystalline cellulose spheres with dimensions of about 0.1 to 0.7 mm are produced industrially, the above carbon spheres can be manufactured with a consistent quality.

A drawback of microcrystalline cellulose is its high price. During the thermal treatment of the microcrystalline cellulose spheres their weight decreases by 80%. This means that the cost per unit weight of the carrier in comparison to carbon spheres obtained according to the state-of-the-art becomes very high.

BRIEF SUMMARY OF THE INVENTION

The present invention is directed to the production of bodies based on metal and carbon, which bodies can easily be produced and have advantageous properties, especially in catalytic applications.

The present invention is based thereon that it has been found possible to produce various types of metal-carbon bodies, depending on the nature of the metal or metals that are used.

In the most general form of the invention it concerns a process for the production of metal-carbon containing bodies, which process comprises impregnating cellulose, cellulose-like or carbohydrate bodies with an aqueous solution of at least one metal compound, followed by heating the impregnated bodies in an inert and substantially oxygen-free atmosphere, thereby reducing at least part of the at least one metal compound to the corresponding metal or metal alloy.

DETAILED DESCRIPTION OF THE INVENTION

Figure 1:
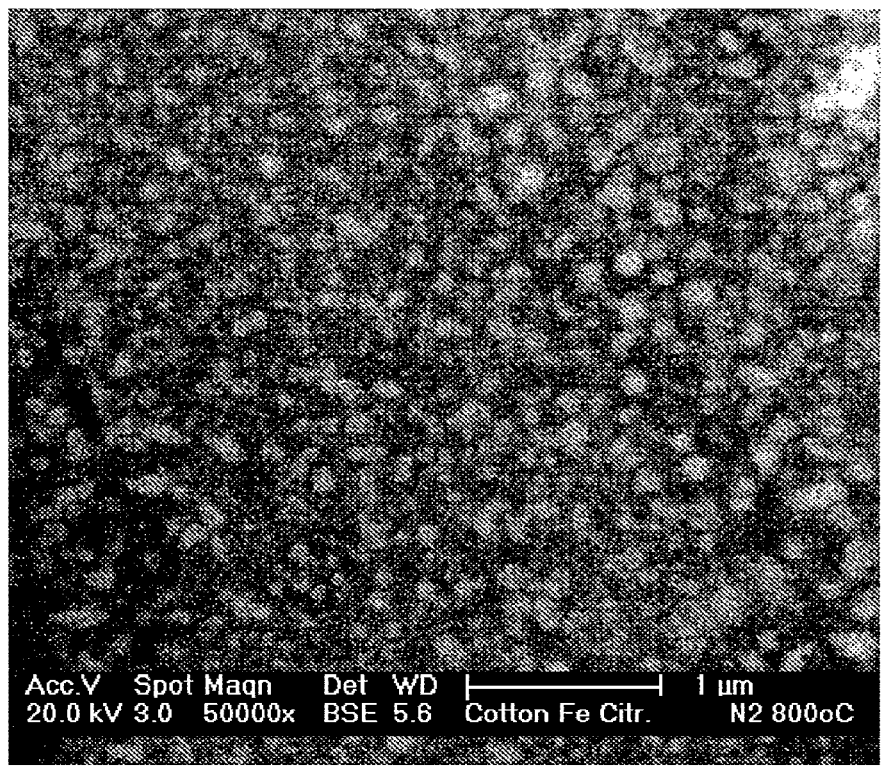
FIG. 1 is a micrograph of the ferromagnetic gauze of graphitic fibers prepared according to Example 1.

In the first embodiment of the invention the objective is to produce carbon support bodies that have their surface covered with metal particles that are not, or only partially, encapsulated by graphitic layers. Such metal particles having a free-metal surface are catalytically active. With metals that cannot react to (unstable) metal carbides impregnation of the initial cellulose-containing bodies with a solution of a compound of the metal to be applied is sufficient. Merely raising the temperature of thus impregnated bodies to the decomposition temperature of the cellulose, results in bodies in which metallic particles have been deposited on the surface of the carbon bodies. Examples of metals not forming carbides are copper and silver. According to the present state-of-the-art reduction of usual copper catalysts is performed with hydrogen. In a technical reactor the reduction of the copper compound is a difficult process due to the high exothermic heat of the reduction reaction. The hydrogen reduction is therefore executed with an inert gas flow containing a very low content (e.g. 0.5 vol. %) of hydrogen; the inert gas flow has to transport the thermal energy out of the reactor. With the catalyst precursors according to the first embodiment of this invention hydrogen is surprisingly not required, which is technically highly attractive in view of the wide explosion limits of hydrogen. Furthermore, the endothermic decomposition of the cellulose balances the exothermic reduction of copper, which can appreciably shorten the period of time involved in the reduction of the copper compound.

Metals that are able to form carbides, such as, molybdenum or iron, are also deposited by impregnation of the initial cellulose-containing bodies. Usually this leads to encapsulated metal particles. Surprisingly we have established that keeping such bodies at a temperature from about 350 to 600° C. in a hydrogen-containing gas flow removes (part of) the encapsulating graphitic layers.

In a second embodiment of the invention, the metal or metals are ferromagnetic. It has been found that in case these metal(s) such as iron, nickel and cobalt or alloys thereof are used, the process results in an encapsulation of the metal by graphitic carbon layers, resulting in a core of a metal (alloy) and a shell of carbon, or an agglomerate of several or many of such encapsulated metal particles. The catalytically active component is applied after the thermal treatment according to the state-of-the-art.

In another embodiment of the invention, the at least one metal is based on a metal or metal compound that is difficult to reduce, such as cobalt, molybdenum, iron or combinations thereof. It has been shown that the reducing gases that are evolved during the thermal decomposition of the cellulose or related materials are very efficient in reducing the metal ions to metallic material, which is deposited on the graphitic carbon that is produced simultaneously by the heating.

Surprisingly, it was found that the impregnation of the cellulose or cellulose-like bodies with compounds of elements that upon reduction react to form ferromagnetic materials during the thermal decomposition of the cellulose, yields strongly ferromagnetic bodies. The ferromagnetic metallic particles are encapsulated by the graphitic layers after the thermal decomposition, and therefore no metal is dissolved upon treatment with a(n) (strong) acid. Therefore, the present invention also relates to ferromagnetic carbon bodies. Obviously, the invention also relates to the loading of carbon bodies with a ferromagnetic material with a low coercive force.

Another aspect of the present invention relates to the separation of the carrier bodies according to the invention, or keeping them in suspension. The application of ferromagnetic carrier bodies has already been proposed in the past. Such bodies can easily be separated from liquids. In WO 99/46782 it is proposed to use carbon nanofibers or nanotubes containing ferromagnetic particles. This patent mentions the application of carriers with ferromagnetic particles with a small coercive force to allow redispersion of the carrier bodies.

A problem that sometimes occurs with the use of carbon bodies, especially produced from microcrystalline cellulose, is the fact that the external surfaces of the spheres contain relatively few pores. The low porosity of the surface of carbon bodies produced from microcystalline cellulose has been mentioned in WO2007/131795 (Glatt). In the case of liquid phase processes with fast occurring catalytic reactions transport limitations are not apparent, such reactions almost exclusively take place at the external surface of the catalyst bodies. However, in the case of reactions proceeding more slowly it is a drawback, because catalytic particles that are present in the interior of the catalyst bodies are not easily accessible to the reactants. Nevertheless, attrition of the catalytically active particles from the surface of the carbonaceous bodies proceeds readily.

One further aspect of the invention relates to improving the porosity of the exterior surface of the carbon spheres obtained by thermal decomposition of cellulose containing compounds. Surprisingly, it was found that a treatment with acid compounds results in the hydrolysis of the cellulose containing compounds, inducing a much higher porosity of the external surface of the carbon bodies upon a subsequent thermal treatment.

According to this preferred embodiment of the invention, the specific surface area of the bodies is increased by increasing the porosity of the graphitic carbon. According to the invention this is done by treating the particles prior to thermally carbonizing with an acidic material. This creates an increased porosity, which is maintained during drying and carbonizing, resulting in a graphitic material having increased surface area, generally in the range of 100 to 1750 $m^2/g$.

The ferromagnetic bodies or particles with the graphitic coating are catalytically active as such, for those reactions that are catalyzed by graphitic carbon.

In a further preferred embodiment, the ferromagnetic bodies or particles may be loaded with a catalytically active material, such as a base metal or precious metal. For this the usual state of the art methods for applying catalytically active material may be used. Since the carbonaceous support is hydrophobic, the usually strongly retarding effect of water on the reduction to the metal is not or much less exhibited.

In the alternative embodiment, the metal-loaded graphitic carbon particles or bodies can be used as catalyst, for example for hydrotreating, in the case of cobalt and molybdenum as metals, or for Fischer-Tropsch in case of cobalt or iron.

Surprisingly, it was further found that from alternative cellulose and/or carbohydrate containing materials, such as soy meal, rice, furfural and derivatives, such as 2-hydroxyfurfural, sugar, hydroxyl ethyl cellulose, cellulose and derivatives and the like, spheres can be produced that also yield mechanically strong carbon spheres upon thermal decomposition. Considering the fact that soy meal is much cheaper in comparison to the very pure microcrystalline cellulose, this is an essential advantage.

Another suitable starting material for the production of carbon spheres is sugar, or a mixture of sugar and microcrystalline cellulose or soy meal. During the thermal decomposition of spheres that predominantly or exclusively comprise sugar, care should be taken that during heating the temperature at which the sugar melts is passed by so quickly that the sugar will decompose before the melting process progresses. Dehydration of the sugar by a hydrothermal treatment before raising the temperature to the pyrolyzing temperature has been found to be effective too. Given the low price of sugar and the other cellulose containing materials, the present invention is of great importance for the technical application of mechanically strong carbon particles.

In general the cellulosic or carbohydrate starting materials will comprise organic materials, generally of renewable sources, that have the property that upon pyrolysis under inert conditions, a gas having reducing properties is obtained. According to a preferred procedure according to the present invention we start from carbonaceous bodies produced by a hydrothermal treatment of agriculturally produced materials, such as, sugars, starch, soy meal, (hemi) cellulose, as well as hydrothermal treatment of partly dehydrated products of the above compounds, such as, furfural and 2-hydroxyfurfural. Preferably dehydration of the above compounds is performed as described in Bo Hu, Shu-Hong Yu, Kan Wang, Lei Liu and Xue-Wei Xu Dalton Trans. 2008, 5414-5423 and in references mentioned therein. After impregnation of the hydrothermally treated bodies, the thermal treatment according to the procedure of the present invention is executed. Alternatively a solution of the metal compounds can also be mixed within the water employed in the hydrothermal treatment.

According to a further preferred embodiment it is thus possible to use relatively cheap materials for the production of the (ferromagnetic) support bodies, such as soy flour, sugar, or more in general carbohydrates, but also cellulose and cellulose-like materials, including micro-crystalline cellulose, and mixtures of two or more thereof.

The ferromagnetic carbon spheres according to the invention can easily be adhered to a mesh of a ferromagnetic metal, such as iron or nickel. The mesh can be magnetized with a permanent magnet or an electromagnet. The significantly changed magnetic field around the filaments of the mesh results in a strong binding of the ferromagnetic carbon spheres to the mesh. By covering the metallic mesh with a silicon dioxide layer the metallic mesh can be rendered inert. A major advantage of attachment by a ferromagnetic force is the fact that the carbon spheres can easily be removed from the mesh by demagnetizing the mesh.

Shaping of the initial cellulose containing material can be carried out according to the present state-of-the-art. Extrusion, if desired to rings or e.g., to trilobs can be executed. If required, addition of carboxymethylcellulose, hydroxyethylcellulose, hydroxypropylcellulose, methylcellulose, polyvinylalcohol, polyvinylpyrolidon, polyethyleneglycol can be employed to facilitate the extrusion and to raise the mechanical properties of the green extrudates. Small spheres to be employed for catalysts suspended in liquids are preferably produced by hydrothermal treatment as described in Bo Hu, Shu-Hong Yu, Kan Wang, Lei Liu and Xue-Wei Xu Dalton Trans. 2008, 5414-5423 and in references mentioned therein.

Typically activated carbon produced from peat or wood contains in addition to some graphitic planes, very small, clustered particles of amorphous carbon. The surface area of the activated carbon is very elevated, where the BET surface area is about 1200 $m^2$ per gram. However, the small particles of amorphous carbon enclose very narrow pores which limit access from a bulk liquid or gas flow.

Another drawback of activated carbon is the liability to oxidation. Treatment of the activated carbon with nitric acid at a temperature of about 90° C. results in the production of carbon dioxide. Also oxidation by atmospheric air during thermal treatments proceeds rapidly. Regeneration of activated carbon is therefore generally not possible. However the rapid oxidation of the activated carbon is advantageous in reclaiming precious metals with carbon-supported precious metal catalysts, since only the metal remains after oxidation of the carbon.

However, a more stable carbon catalyst support, such as graphitic carbon, would be very attractive. Conversion of the activated carbon into graphitic carbon would therefore be highly attractive; In particular a process in which shaped bodies of activated carbon can be reacted to graphitic carbon without adversely affecting the mechanical strength of the carbon bodies. An important characteristic of bodies of graphitic carbon produced out of activated carbon is that the pore-size distribution of the graphitic carbon bodies is much more favorable. Transport to the large internal surface of the graphitic carbon proceeds much more rapidly. Another embodiment of our invention involves metal-carbon bodies in which the carbon is almost completely present as graphitic material with a high surface area.

Surprisingly we have observed that production of such carbon bodies according to our invention is possible by loading the carbon precursor, or the carbon with particles of metals capable of forming metal carbides, and thermally treating the thus loaded carbon bodies in an inert gas atmosphere at a temperature above about 700° C. The thermal treatment leads to an essentially complete recrystallization of the amorphous carbon to graphitic carbon. Preferably the treatment is executed in a nitrogen atmosphere. More preferably the nitrogen atmosphere is purified from oxygen by passing through a fixed bed of a reduced copper catalyst. Even more preferably the nitrogen is employed mixed with about 0.5 vol. % of hydrogen and the nitrogen is passed over a supported palladium catalyst at room temperature.

The recrystallization of the amorphous carbon can be achieved by applying nickel, cobalt, iron, tungsten or molybdenum on the activated carbon or on the precursor of the carbon-metal bodies according to the present invention. Most preferred is iron, in view of the availability and the price of iron. Surprisingly it has been found that employment of ammonium iron citrate as an iron precursor leads to recrystallization of the carbon at a lower temperature than iron (III) nitrate. Therefore ammonium iron citrate is preferred as an iron precursor.

The actual mechanism for this is effect is not known, but it is assumed that the reaction of the amorphous carbon is due to an intermediate reaction to a metal carbide. The amorphous carbon is thermodynamically unstable with respect to the carbon in the metal carbide. In contrast, graphitic carbon is thermodynamically more stable than the carbon in the metal carbide. To achieve the conversion of the amorphous carbon mobility of the metal particles over the graphitic surface is required; after conversion of the amorphous carbon the metal particles migrate over the graphitic surface to location where amorphous carbon is still present.

With metals and alloys that can be reduced at a relatively low temperature, such as, nickel or nickel-iron alloys, small metal particles result supported on the amorphous carbon. Since carbon atoms in metal carbides are already mobile at temperatures of about 350° C., metals capable of forming metal carbides are often encapsulated in graphitic layers. The number of graphitic layers varies depending on the specific conditions of the thermal treatment and the reducibility of the metal, but three to about ten is usual.

In a specific embodiment of our invention the graphitic layers are removed by a thermal treatment in pure hydrogen. In pure hydrogen the thermodynamic equilibrium shifts to methane, causing the graphitic layers encapsulating the metal particles to be removed as methane. A compromise between the thermodynamic stability of graphite and the rate of removal of the graphitic layers has therefore to be set up. When the metal-carbon bodies are therefore to be employed as catalysts with the metal or alloy particles as the catalytically active component, a thermal treatment in pure hydrogen at a temperature where methane is thermodynamically stable rather than graphite according to a special embodiment of our invention.

Surprisingly we have also observed that conventional activated carbon can be converted into graphitic carbon employing the procedure according to our invention. According to a special embodiment of our invention we apply a precursor of a metal capable of forming a metal carbide, such as, nickel on the surface of the activated carbon and we thermally treat the loaded activated carbon in an inert gas atmosphere at a temperature greater than 700° C. In some embodiments, the temperature may range from about 700° C. to 1250° C.

The extent of encapsulation of the metal particles is determined by treatment the particles with a strong acid, such as hydrochloric acid and measuring the evolution of hydrogen. It has been observed that the metal particles are not completely encapsulated as is suggested already by the above mechanism of recrystallization of the amorphous carbon. If the metal-carbon bodies according this embodiment of the invention are to be employed as catalysts with the metal particles as the catalytically active component, the incomplete encapsulation is favorable. However, if the metal-carbon bodies are to be employed as a ferromagnetic support, complete encapsulation is a prerequisite. According to the present invention we can achieve complete encapsulation by exposure the graphitized metal-carbon bodies to a carbon-delivering gas flow, such as, toluene, methane, or carbon monoxide together with hydrogen, at a temperature from about 350 to about 600° C.

The invention is now elucidated on the basis of some examples, which are not intended to limit the scope of the invention.

Example 1

A piece of cotton fabric of 1×1 cm$^2$ was wet-impregnated with a solution of ammonium iron citrate in water. Next the impregnated fabric was dried in air under ambient conditions. Subsequently, the fabric was kept at 800° C. in an inert nitrogen gas flow. This resulted in a ferromagnetic gauze of graphitic fibers of 0.2 mm diameter densely loaded with iron particles of diameters around 10 to 20 nm as evident from the accompanying micrograph (FIG. 1) which. The micrograph represents an image taken with back-scattered electrons in a scanning electron microscope. The back-scattered electrons are imaging the iron particles at a high intensity in view of the relatively high nuclear charge of iron atoms as compared to that of carbon.

Example 2

Commercially available micro crystalline cellulose (MCC) spheres (Cellets, neutral pellets of Syntapharm GmbH, Mülheim an der Ruhr, Germany), with a size range of 100-200 µm, were loaded with copper nitrate by immersing the spheres in a solution of copper nitrate. The spheres were left in the solution for 24 h during which the solution was occasionally stirred. The impregnated spheres were subsequently separated from the solution by filtering using a Büchner funnel with glass filter. The spheres were then dried at room temperature in vacuo to constant weight. Subsequently, the impregnated spheres were pyrolyzed by thermal treatment in a stagnant inert nitrogen gas atmosphere in a quartz tube reactor (Thermolyne 21100 furnace). The heating rate was 5° C./min and the spheres were kept at 800° C. for 3 h. The thermal treatment resulted in metal-carbon of a size of approximately 70 μm.

Figure 2:
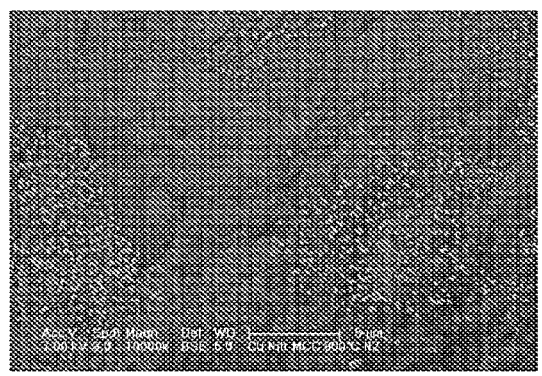
FIG. 2 is a micrograph of Example 2 that represents an image taken with back-scattered electrons in a scanning electron microscope.

This next micrograph (FIG. 2) represents an image taken with back-scattered electrons in a scanning electron microscope. The back-scattered electrons are imaging preferably the heavy elements, and with the thus produced metal-carbon bodies the copper particles are imaged with a relatively high intensity. It can be seen that the external surface of the metal-carbon bodies contains many small metallic copper particles.

Figure 3:
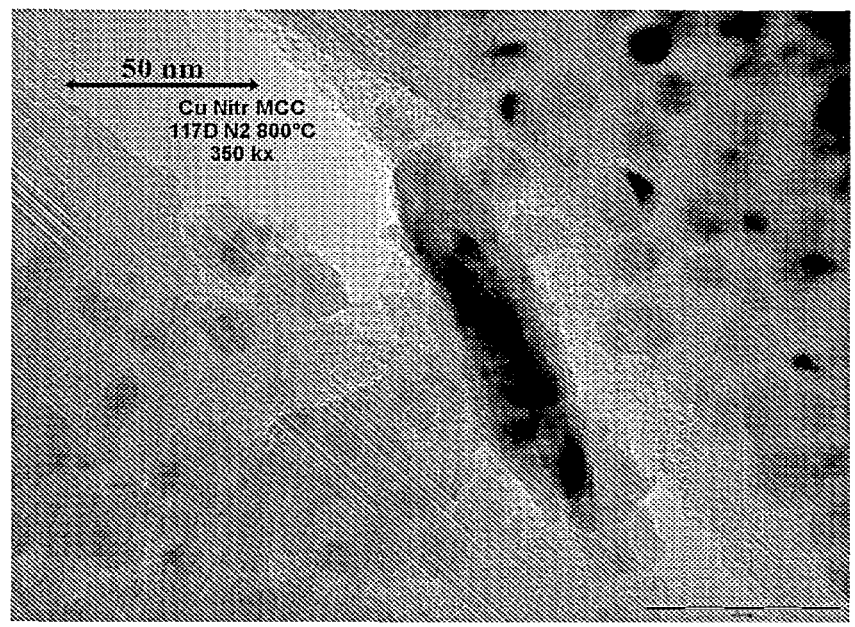
FIG. 3 is a micrograph taken with a transmission electron microscope on a ground sample of the copper-carbon bodies prepared according to Example 2.

The above micrograph (FIG. 3) has been taken with a transmission electron microscope on a ground sample of the copper-carbon bodies prepared as described. Transmission electron shows that the complete volume of the carbon bodies contains numerous small copper particles. The presence of metallic copper was confirmed by elemental analysis. Evident is one big copper platelet present at the center of the micrograph. Importantly, carbon species can also be seen in the micrograph. The carbon is present as extremely small amorphous carbon particles. Therefore even at 800° C. the amorphous carbon does not completely recrystallize to graphitic carbon.

Example 3

A 1M aqueous solution of sucrose in demineralised water was placed in a Teflon-lined autoclave. The solution was kept at 160° C. for 4 h. Subsequently the solid product was separated from the liquid by centrifugation and washed with a mixture of ethanol, acetone and demineralised water, until a colourless solution was obtained. The resulting black powder was dried at room temperature in vacuo to constant weight. The hydrophilic colloidal carbon spheres were loaded by immersing the spheres into an aqueous solution of nickel nitrate. The spheres were left in the solution for 24 h during which the solution was occasionally stirred. Next, the impregnated spheres were separated from the solution using a Büchner funnel with glass filter. The thus obtained spheres were dried at room temperature in vacuo to constant weight. The impregnated spheres were subsequently pyrolyzed by thermal treatment within a stagnant inert nitrogen gas atmosphere in a quartz tube reactor (Thermolyne 21100 furnace). The heating rate was 5° C./min and the spheres were treated for 3 h at 800° C.

Figure 4:
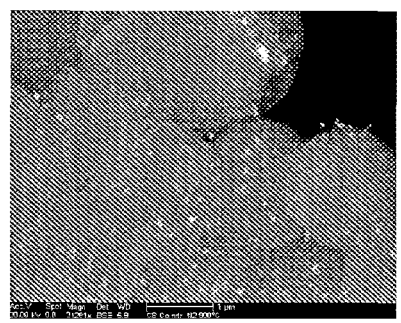
FIG. 4 is a micrograph of Example 3 that represents an image taken with back-scattered electrons in a scanning electron microscope.

The next micrograph (FIG. 4) represents an image taken with back-scattered electrons in a scanning electron microscope. The back-scattered electrons are imaging the nickel particles at a relatively high intensity. The external edge of the metal-carbon bodies contains many small nickel particles. Transmission electron microscopy on a ground sample of the metal-carbon bodies shows that also the volume of the metal-carbon bodies contains numerous small nickel particles.

Example 4

Figure 5:
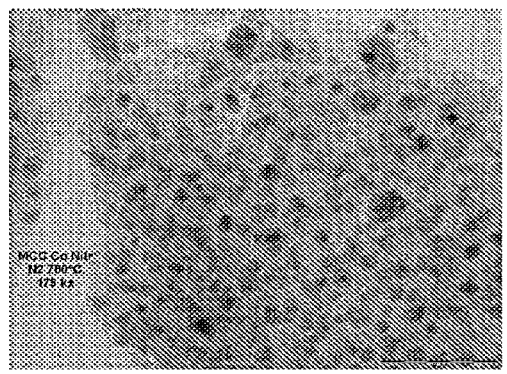
FIG. 5 is a micrograph of Example 4 that shows a mechanically pulverized sample with metallic cobalt particles present on a carbonaceous matrix.

Commercially available micro crystalline cellulose (MCC) spheres (Cellets, neutral pellets of Syntapharm GmbH, Mülheim an der Ruhr, Germany), of a size range of 100-200 μm were loaded by immersing the spheres into an aqueous solution of cobalt nitrate. The spheres were left in the solution for 24 h during which the solution was occasionally stirred. Next, the impregnated spheres were separated from the liquid using a Büchner funnel with glass filter. The separated spheres were dried at room temperature in vacuo to constant weight. Subsequently, the impregnated spheres were pyrolyzed by thermal treatment in a stagnant inert nitrogen gas atmosphere in a quartz tube reactor (Thermolyne 21100 furnace). The heating rate was 5° C./min and the samples were kept for 3 h at 700° C. This resulted in metal-carbon containing bodies with ferromagnetic properties with a size of approximately 70 μm. The enclosed micrograph (FIG. 5) shows a mechanically pulverized sample with metallic cobalt particles present on a carbonaceous matrix. The image was taken with a transmission electron microscope.

Figure 6:
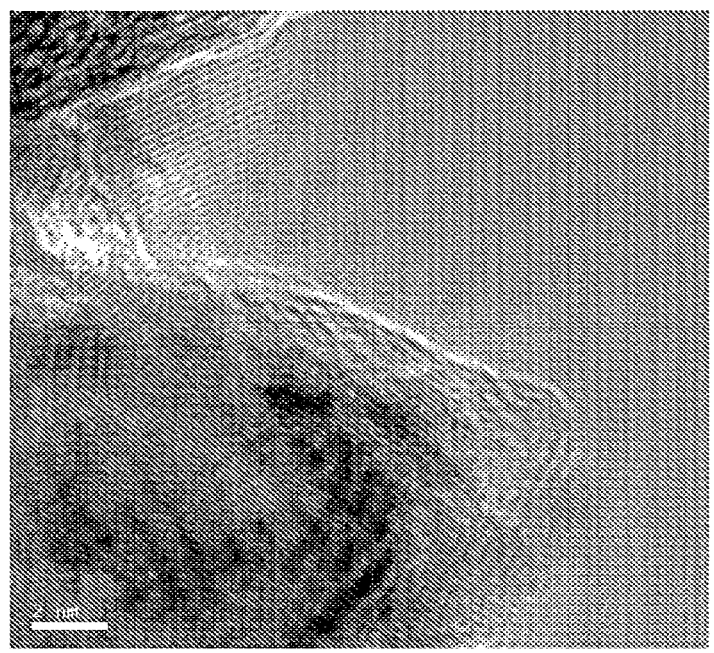
FIG. 6 is a micrograph that has been taken from the same material of Example 4 at the very high magnification of $1.2 \times 10^6$.

Reduction of supported cobalt species to metallic cobalt is a relatively difficult process, since water vapour strongly inhibits the reduction. To demonstrate that the reduction to metallic cobalt proceeds smoothly with the procedure according to the present invention, the next micrograph (FIG. 6) has been taken from the same material at the very high magnification of $1.2 \times 10^6$. At a high magnification the lattice plane of cobalt can be imaged. From the Fourier transform of the square indicated in the image the distance between the lattice planes has been calculated. The distance between the lattice planes is 0.191 nm, which agrees very well with the lattice distance of hexagonal cobalt, which amounts to 0.192 nm.

Example 5

Figure 7:
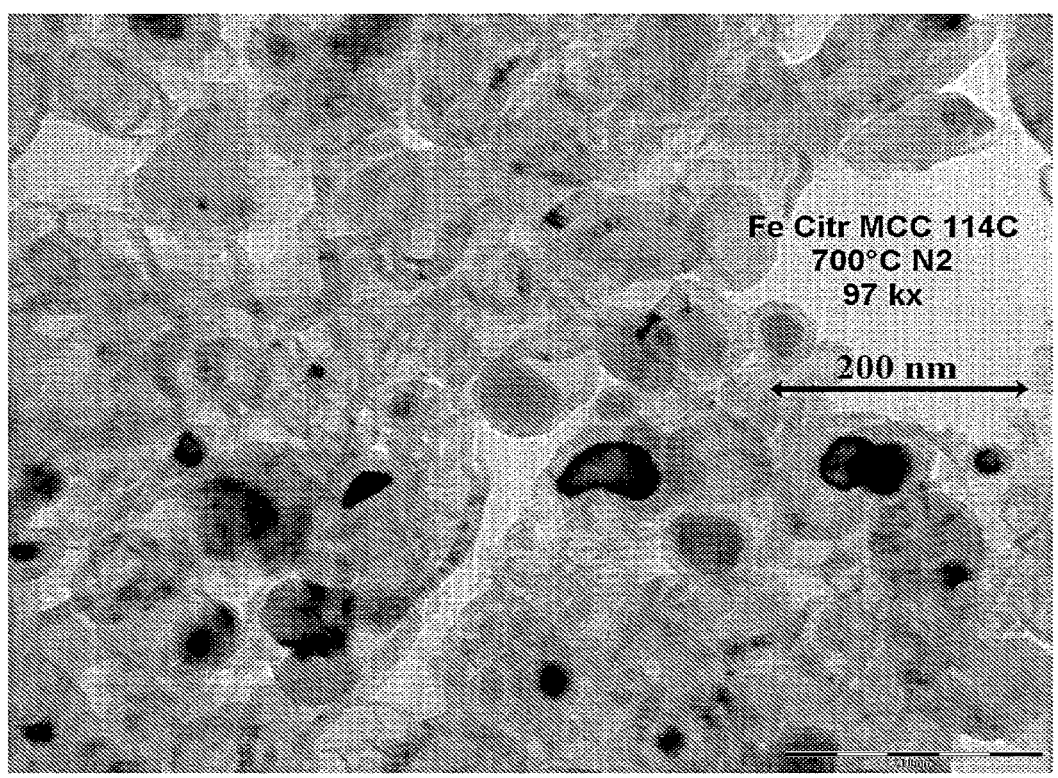
FIG. 7 is a micrograph has been taken from a ground sample of Example 5 after ultrasonic dispersion in ethanol.
Figure 8:
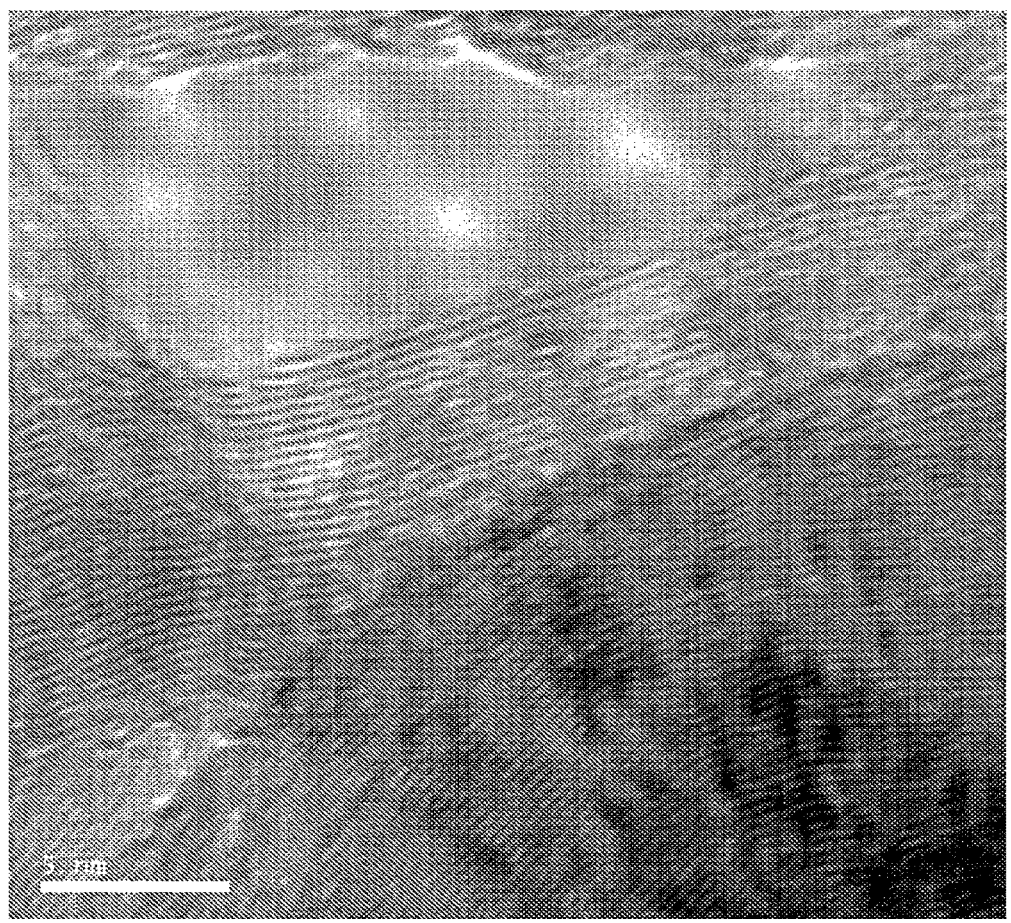
FIG. 8 is a micrograph confirms the presence of carbon completely recrystallized to graphitic carbon taken at a high magnification of 920 kx, at which the atomic layers of graphitic carbon can be seen.

Commercially available micro crystalline cellulose (MCC) spheres (Cellets, neutral pellets of Syntapharm GmbH, Mülheim an der Ruhr, Germany), with a size range of 100-200 μm were loaded by immersing the spheres into an aqueous solution of ammonium iron citrate. The spheres were left in the solution for 24 h during which the solution was occasionally stirred. Next, the impregnated spheres were separated from the liquid using a Büchner funnel with glass filter. The separated spheres were dried at room temperature in vacuo to constant weight. Subsequently, the impregnated and dried spheres were pyrolyzed by thermal treatment in a stagnant inert nitrogen atmosphere in a quartz tube reactor (Thermolyne 21100 furnace). The heating rate was 5° C./min and the samples were treated for 3 h at 700° C. This resulted in metal-carbon containing bodies with ferromagnetic properties with a size of approximately 70 μm. The enclosed micrograph (FIG. 7) has been taken from a ground sample after ultrasonic dispersion in ethanol. Iron particles (some partly) encapsulated by graphitic layers are apparent. The incomplete encapsulation was established by quantitatively measuring the evolution of hydrogen upon immersion in hydrochloric acid. The effect of the presence of iron, a metal capable of forming a metal carbide, is evident. No amorphous carbon is visible, only fibers of graphitic carbon. The difference with the transmission electron micrograph of Example 2 (FIG. 3) is striking; in spite of the lower temperature of 700° C. as compared to 800° C. employed with the sample of example 2, the carbon has completely recrystallized. To confirm the presence of carbon completely recrystallized to graphitic carbon the next micrograph (FIG. 8) has been taken at a high magnification of 920 kx, at which the atomic layers of graphitic carbon can be seen. The graphitic layers are apparent in this micrograph. It is very surprising that complete recrystallization to graphitic carbon can be realized by the presence of metal particles capable of forming metal carbides at a relatively low temperature of 700° C.

The invention claimed is:

1. A process for producing catalytically active ferromagnetic metal particles encapsulated by graphitic carbon layers, wherein the process comprises:
    impregnating cellulose, cellulose derivative, carbohydrate or carbohydrate derived bodies with an aqueous solution of at least one metal compound; and
    heating the impregnated cellulose, cellulose derivative, carbohydrate or carbohydrate derived bodies in an inert and oxygen-free atmosphere at a temperature from about 700° Celsius to 1250° Celsius, wherein the heating reduces at least part of the at least one metal compound to a corresponding ferromagnetic metal or ferromagnetic metal alloy, and wherein the heating leads to an essentially complete recrystallization of amorphous carbon to graphitic carbon.

2. The process of claim 1, wherein the process results in complete encapsulation of the ferromagnetic metal particles by the graphitic carbon layers by exposing the metal-carbon bodies to a carbon-delivering gas flow, together with hydrogen, at a temperature from about 350° Celsius to about 600° Celsius.

3. The process of claim 2, wherein each of the ferromagnetic metal is nickel or a nickel alloy.

4. The process of claim 1, wherein the cellulose, cellulose derivative, carbohydrate or carbohydrate derived bodies are produced from materials selected from soy, carbohydrates, sugar, cellulosic materials, microcrystalline cellulose, or mixtures of two or more thereof.

5. The process of claim 4, wherein the materials are soy flour or a mixture of soy flour and sugar.

6. The process of claim 1, wherein the impregnated bodies, prior to the heating and reducing, are treated with an acidic compound.

7. The process of claim 1, wherein the heating and reducing step comprises heating the impregnated bodies for a period between 5 min and 4 hours, at a temperature between 700° Celsius and 1250° Celsius.

8. The process of claim 1, wherein the catalytically active ferromagnetic particles are loaded with a catalytically active material, wherein said catalytically active material is a base metal or a precious metal, wherein said base metal is selected from iron, cobalt and molybdenum, and wherein said precious metal is selected from platinum, palladium and ruthenium.

9. The process of claim 1, wherein the cellulose, cellulose derivative, carbohydrate or carbohydrate derived bodies are in a form of extrudates.

10. The process of claim 1, wherein the at least one metal compound comprises one or more of copper nitrate, nickel nitrate, or cobalt nitrate.

11. The process of claim 1, wherein the at least one metal compound comprises copper nitrate.

12. The process of claim 1, wherein the at least one metal compound is selected from iron, nickel, or cobalt.

* * * * *